US011933903B2

(12) United States Patent
Kameyama et al.

(10) Patent No.: US 11,933,903 B2
(45) Date of Patent: Mar. 19, 2024

(54) LASER RADAR DEVICE

(71) Applicant: MITSUBISHI ELECTRIC CORPORATION, Tokyo (JP)

(72) Inventors: Shumpei Kameyama, Tokyo (JP); Eisuke Haraguchi, Tokyo (JP); Yutaka Kajiyama, Tokyo (JP); Nobuki Kotake, Tokyo (JP); Takayuki Yanagisawa, Tokyo (JP); Toshiyuki Ando, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 849 days.

(21) Appl. No.: 16/976,401

(22) PCT Filed: Mar. 29, 2018

(86) PCT No.: PCT/JP2018/013302
§ 371 (c)(1),
(2) Date: Aug. 27, 2020

(87) PCT Pub. No.: WO2019/186914
PCT Pub. Date: Oct. 3, 2019

(65) Prior Publication Data
US 2020/0408918 A1 Dec. 31, 2020

(51) Int. Cl.
*G01S 17/00* (2020.01)
*G01S 7/481* (2006.01)
(Continued)

(52) U.S. Cl.
CPC ............. *G01S 17/95* (2013.01); *G01S 7/481* (2013.01); *G01S 7/484* (2013.01); *G01S 7/486* (2013.01)

(58) Field of Classification Search
USPC .............................................. 356/4.01, 5.01
See application file for complete search history.

(56) References Cited

U.S. PATENT DOCUMENTS 8,188,418 B1    5/2012  Kondratko et al.
9,618,530 B2 *  4/2017  Imaki .................... G01S 17/18
(Continued)

FOREIGN PATENT DOCUMENTS

CN      105005054 A     10/2015
EP      0 290 128 A2    11/1988
(Continued)

OTHER PUBLICATIONS

Abari et al., "An all-fiber image-reject homodyne coherent Doppler wind lidar", Optics Express, Oct. 14, 2014, vol. 22, No. 21, 25880-25894, total 15 pages.
(Continued)

*Primary Examiner* — James R Hulka
(74) *Attorney, Agent, or Firm* — Birch, Stewart, Kolasch & Birch, LLP

(57) ABSTRACT

An optical transmission unit (3) transmits an optical signal having a light intensity set as a Low level component of a pulse. An optical partial reflector (6) is provided on a path through which transmission light is transmitted from a circulator (5) to the atmosphere, and reflects the optical signal. A detection unit (11) performs coherent detection on reception light using, as local light, a signal in a Low level section in the optical signal reflected by the optical partial reflector (6).

11 Claims, 4 Drawing Sheets

(51) Int. Cl.
*G01S 7/484* (2006.01)
*G01S 7/486* (2020.01)
*G01S 17/95* (2006.01)

(56) References Cited

U.S. PATENT DOCUMENTS

| | | | |
|---|---|---|---|
| 10,175,346 B2 * | 1/2019 | Kotake | G01S 17/58 |
| 10,234,544 B2 * | 3/2019 | Ando | G01S 17/58 |
| 10,379,136 B2 * | 8/2019 | Kotake | G01S 17/86 |
| 11,112,502 B2 * | 9/2021 | Kotake | G01S 17/58 |
| 11,474,256 B2 * | 10/2022 | Kotake | G01S 17/87 |
| 11,709,229 B2 * | 7/2023 | Ando | G01S 7/4818 |
| | | | 356/5.09 |
| 2006/0071846 A1 * | 4/2006 | Yanagisawa | G01S 7/481 |
| | | | 342/54 |
| 2014/0233013 A1 * | 8/2014 | Sakimura | G01S 7/4815 |
| | | | 356/5.01 |
| 2015/0241461 A1 * | 8/2015 | Imaki | G01P 5/26 |
| | | | 356/28 |
| 2016/0291135 A1 | 10/2016 | Ando et al. | |
| 2017/0153327 A1 * | 6/2017 | Nishioka | G01S 17/58 |
| 2017/0307648 A1 * | 10/2017 | Kotake | G01S 7/484 |
| 2017/0361759 A1 * | 12/2017 | Kim | B60Q 1/085 |
| 2018/0156893 A1 * | 6/2018 | Kotake | G01S 17/18 |
| 2018/0180247 A1 * | 6/2018 | Park | F21S 41/285 |
| 2018/0356440 A1 * | 12/2018 | Kotake | G01S 17/86 |
| 2019/0064361 A1 * | 2/2019 | Kotake | G01S 17/42 |
| 2020/0049799 A1 * | 2/2020 | Ando | G01S 7/484 |
| 2020/0064485 A1 * | 2/2020 | Kotake | G01S 17/95 |
| 2020/0081126 A1 * | 3/2020 | Nishino | G01S 7/4817 |

FOREIGN PATENT DOCUMENTS

| | | |
|---|---|---|
| EP | 3 605 140 A1 | 2/2020 |
| JP | 58-111775 A | 7/1983 |
| JP | 62-38380 A | 2/1987 |
| JP | 5542419 B2 | 7/2014 |
| JP | 6274368 B1 | 2/2018 |
| WO | WO 2015/087842 A1 | 6/2015 |

OTHER PUBLICATIONS

Ando et al., "All-fiber coherent Doppler LIDAR technologies at Mitsubishi Electric Corporation," IOP Conference Series: Earth and Environmental Science, vol. 1, 2008, total 11 pages.

Office Action for Japanese Patent Application No. 2020-508718 dated Jul. 28, 2020.

Extended European Search Report dated Feb. 4, 2021 in corresponding European Patent Application No. 18 911 713.8.

Office Action dated Feb. 12, 2022 issued in corresponding European Patent Application No. 18 911 713.8.

European Communication pursuant to Article 94(3) EPC for European Application No. 18911713.8, dated Oct. 11, 2021.

Chinese Office Action and Search Report for Chinese Application No. 201880091599.0, dated Nov. 27, 2023, with English translation.

* cited by examiner

LASER RADAR DEVICE

TECHNICAL FIELD

The present invention relates to a laser radar device using coherent detection.

BACKGROUND ART

As laser radar devices for measuring wind, systems using coherent detection that enables Doppler frequency measurement and high-sensitivity reception are mainly used. In such a laser radar device, a pulse method is necessary for simultaneous measurement of the distribution in a distance direction, and this method is conventionally used (for example, see Non-Patent Literature 1).

Conventional laser radar devices divide continuous wave (CW) light from a light source into transmission light and local light, pulse-modulate the transmission light, amplify by an optical amplifier, transmit and receive the pulse light to and from aerosols in the atmosphere via an optical circulator and a transmission and reception optical system, multiplex reception light and the local light by an optical multiplexer, and perform coherent detection by a light receiving element and a current-voltage converter. Provided is the function of obtaining a wind speed that corresponds to a Doppler frequency shift for each distance by performing frequency analysis on the detected signal by a signal processor.

CITATION LIST

Non-Patent Literature

Non-Patent Literature 1: T. Ando et al., "All-fiber coherent Doppler technologies at Mitsubishi Electric Corporation," IOP Conference Series: Earth and Environmental Science, Volume 1, 2008.

SUMMARY OF INVENTION

Technical Problem

However, conventional laser radar devices that obtain a wind speed distribution in a distance direction, especially those using the coherent method and the pulse method described above, have the following disadvantages. That is, it is necessary in laser radar devices that the polarization of scattered light from aerosols in the atmosphere and the polarization of local light match when the scattered light and the local light are multiplexed and subjected to coherent detection, in order to maintain a high detection efficiency. Therefore, in conventional laser radar devices, it is necessary to use costly components for maintaining the polarization in optical components or an optical transmission system. Another factor for an increase in costs is the need of a splitter for splitting output of a light source into transmission light and local light and a multiplexer for multiplexing the local light and reception light.

The present invention has been made to solve the above-described disadvantages, and an object of the invention is to provide a laser radar device capable of simplifying the configuration and reducing costs.

Solution to Problem

A laser radar device according to the present invention includes: an optical transmitter to transmit a pulse-modulated optical signal having a light intensity set as a low-level component of a pulse; a circulator to transmit the optical signal as transmission light and acquire reflection light from a target in an atmosphere as reception light; an optical partial reflector to reflect the optical signal, the optical partial reflector being provided on a path through which the transmission light is transmitted from the circulator to the atmosphere; and a detector to perform coherent detection on the reception light using, as local light, a signal in a Low level section of the optical signal reflected by the optical partial reflector.

Advantageous Effects of Invention

According to the laser radar device of the present invention, a pulse-modulated optical signal is reflected by the optical partial reflecting unit, and reflection light in the Low level section of the optical signal is used as local light. As a result, the configuration can be simplified and costs can be reduced.

DESCRIPTION OF EMBODIMENTS

To describe the present invention further in detail, embodiments for carrying out the present invention will be described below by referring to the accompanying drawings.

First Embodiment

Figure 1:
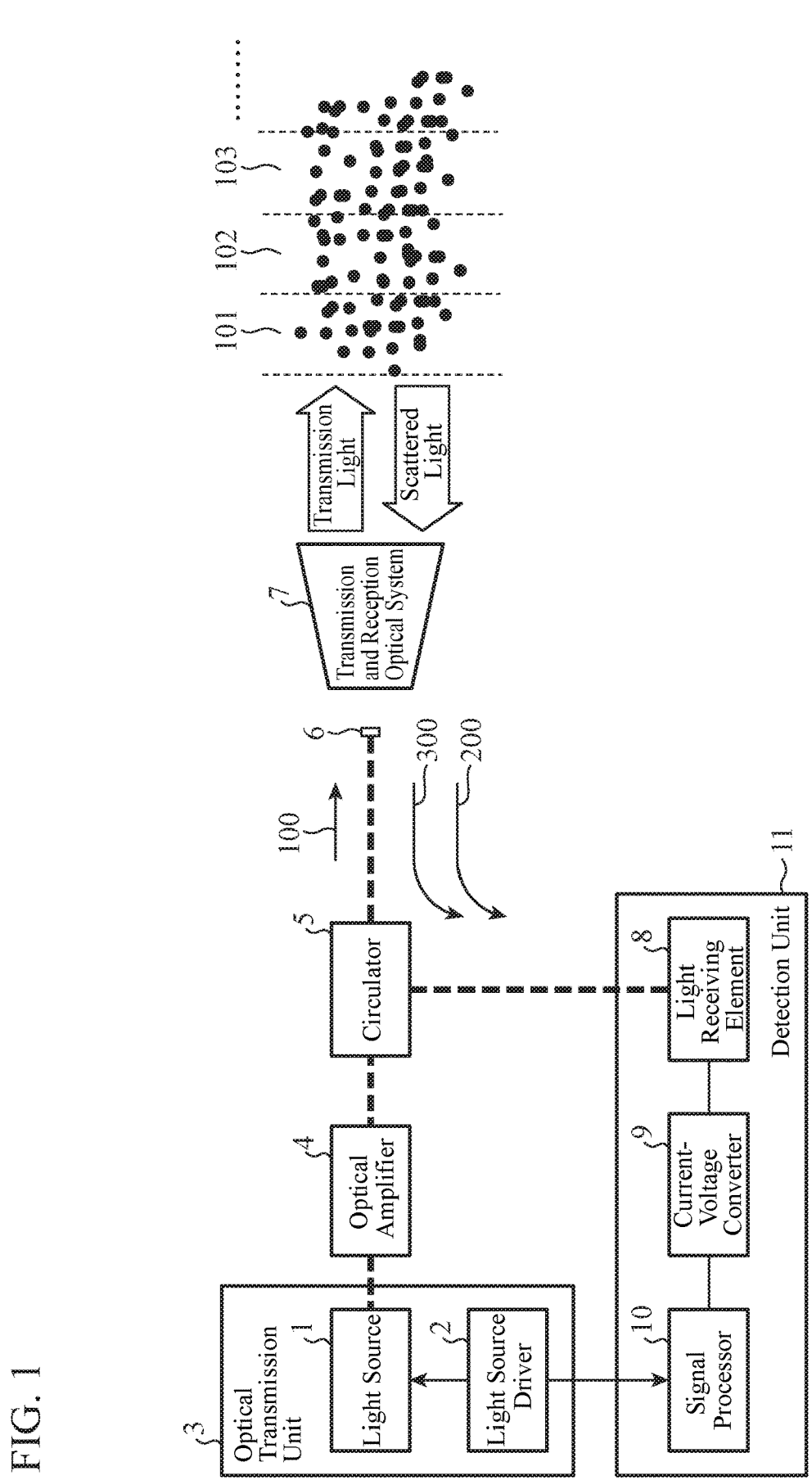
FIG. 1 is an explanatory diagram illustrating a configuration and the operation of a laser radar device according to a first embodiment of the present invention.

FIG. 1 is an explanatory diagram illustrating a configuration and the operation of a laser radar device according to the present embodiment.

The laser radar device illustrated in FIG. 1 includes an optical transmission unit 3 including a light source 1 and a light source driver 2, an optical amplifier 4, a circulator 5, an optical partial reflector 6, a transmission and reception optical system 7, and a detection unit 11 including a light receiving element 8, a current and voltage converter 9, and a signal processor 10. The optical transmission unit 3 is a processing unit that transmits a pulse-modulated optical signal having a light intensity set as a Low level component of the pulse. The light source 1 of the optical transmission unit 3 is a circuit or an element that emits light, and the light source driver 2 is a device for pulse-modulating an optical signal output from the light source 1. The optical amplifier 4 is a circuit that amplifies the optical signal transmitted from the optical transmission unit 3. The circulator 5 is a device that transmits the optical signal as transmission light and acquires reflection light from a target in the atmosphere as reception light. There is a space from the transmission output end of the circulator 5, and the transmission and reception optical system 7 is disposed ahead of the space. In this space and the transmission and reception optical system 7, polarization of light is maintained.

The optical partial reflector 6 is an optical partial reflecting unit provided on a path through which the transmission light is transmitted from the transmission output end of the circulator 5 to the atmosphere. In the illustrated example, the optical partial reflector 6 is provided between the transmission output end of the circulator 5 and the transmission and reception optical system 7, as an optical partial reflecting unit. The transmission and reception optical system 7 is an optical system for emitting transmission light from the circulator 5 into the atmosphere and acquiring reflection light from a target. The detection unit 11 is a processing unit that performs coherent detection on reception light from the circulator 5 using, as local light, a signal in a Low level section reflected by the optical partial reflector 6. The light receiving element 8 of the detection unit 11 is an element performing coherent detection on the local light and the reception light and converting a result of the coherent detection into a current signal. The current-voltage converter 9 is a device that converts the current signal from the light receiving element 8 into a voltage signal. The signal processor 10 is a device that performs a frequency analysis on the voltage signal from the current-voltage converter 9.

In such a configuration, as illustrated by broken lines in the figure, although the transmission paths between the light source 1 and the optical amplifier 4, between the optical amplifier 4 and the circulator 5, between the circulator 5 and the optical partial reflector 6, and between the circulator 5 and the light receiving element 8 are optical transmission paths, it is not necessary to use polarization-maintaining systems such as polarization-maintaining fibers. Specifically, the connection is made by single-mode optical fibers that do not maintain polarization. Meanwhile, the transmission paths between the light source driver 2 and the light source 1, between the light source driver 2 and the signal processor 10, between the light receiving element 8 and the current-voltage converter 9, and between the current-voltage converter 9 and the signal processor 10 are implemented by corresponding electric signal lines. These signal lines are illustrated by solid lines. Furthermore, distances 101, 102, 103, . . . each indicate distances of aerosols in the atmosphere from the transmission and reception optical system 7. Arrow 100 indicates transmission light output from the circulator 5, arrow 200 indicates local light input to the circulator 5, and arrow 300 indicates reception light input to the circulator 5.

The optical amplifier 4 and the transmission and reception optical system 7 are for transmitting light with a large power and receiving light with a large reception aperture, and are used to ensure a signal-to-noise power ratio in reception. However, they are not necessarily essential components for the laser radar device of the first embodiment, because, for example in a case where only a very short distance is measured, the optical transmission power may be small and no large reception aperture is required, and there are cases where a sufficient signal-to-noise power ratio can be ensured even without the optical amplifier 4 and the transmission and reception optical system 7.

In FIG. 1, the light source 1, the optical amplifier 4, the circulator 5, and the light receiving element 8 are components having an optical fiber pigtail that is not a polarization-maintaining type, and the optical amplifier 4 is an optical fiber amplifier that is not a polarization-maintaining type.

Next, the operation of the laser radar device according to the first embodiment will be described.

Figure 2:
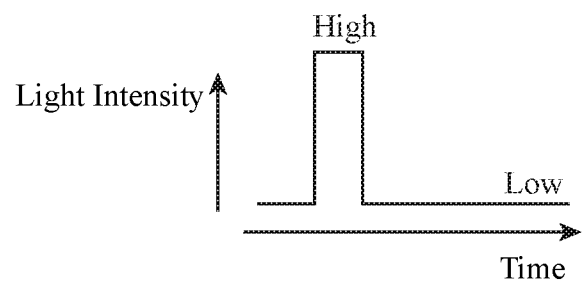
FIG. 2 is an explanatory diagram of a pulse-modulated optical signal of the laser radar device according to the first embodiment of the present invention.

Pulse modulation is applied to the light source 1 by a modulation signal from the light source driver 2. At this point, the extinction ratio (light intensity ratio between a high time period and a low time period in pulse modulation) is adjusted so that a certain level of continuous wave (CW) light is output even in the low time period. A schematic diagram of pulse-modulated light is illustrated in FIG. 2. As illustrated in FIG. 2, a low-level signal is obtained by adjusting the extinction ratio and causing a slight leak. Furthermore, the light source driver 2 transmits a trigger signal to the signal processor 10 in synchronization with the pulse modulation.

An optical signal from the light source 1 is amplified by the optical amplifier 4 and sent to the circulator 5. The optical signal has the same shape as that in the schematic diagram of FIG. 2 also in the output from the optical amplifier 4. The optical signal from the optical amplifier 4 is sent to the optical partial reflector 6 via the circulator 5. The optical partial reflector 6 reflects a part of the optical signal sent from the circulator 5 while maintaining the polarization of the optical signal immediately before incidence on the optical partial reflector 6. This reflection light is referred to as partial reflection light in the following description. As will be described later, this partial reflection light is used as local light in coherent detection.

The optical signal that has passed through the optical partial reflector 6 is transmitted into the atmosphere via the transmission and reception optical system 7, as transmission light. Scattered light from the aerosols in the atmosphere is received as reception light via the transmission and reception optical system 7. At this point, not only the signal at pulse High but also the signal at Low are transmitted and received into and from the atmosphere, but only the optical signal at pulse High is used. The reception light for the Low signal works as disturbing light; however, it is only required to appropriately adjust the extinction ratio in the pulse modulation so that the level of this disturbing light is sufficiently low with respect to the reception light for transmission of a desired pulse High component.

The scattered light received by the transmission/reception optical system 7 passes through the optical partial reflector 6, as a reception signal, and is sent to the circulator 5. At this point, the partial reflection light and the reception light are multiplexed. At this point, the polarization is maintained during the process from when the optical signal is scattered by the aerosols in the atmosphere via the optical partial reflector 6 and the transmission and reception optical system 7 until the scattered optical signal as reception light is multiplexed with the partial reflection light. Therefore, the partial reflection light and the reception light can be multiplexed in a state where their respective polarizations match. As for the multiplexing of the partial reflection light and the reception light, the multiplexing is performed with a time gap by the time for the optical signal to make a round trip in the atmosphere. Therefore, if the polarization state in the laser radar device changes during this round-trip time, the degree of coincidence of polarizations between the partial reflection light and the reception light decreases in the multiplexing, thereby deteriorating the detection efficiency. However, the round-trip time of light is quite short. For example, it takes only 0.1 ms to make a round trip over a distance of 15 km. Meanwhile, fluctuation in the polarization occurs for a period of the order of one second. Therefore, it is conceivable that fluctuation in the polarization during the round-trip time of light is negligible.

Figure 3A:
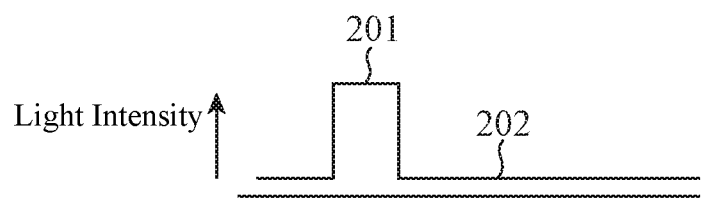
FIGS. 3A and 3B are explanatory graphs illustrating a timing shift in a time direction between partial reflection light and reception light of the laser radar device according to the first embodiment of the present invention.
Figure 3B:
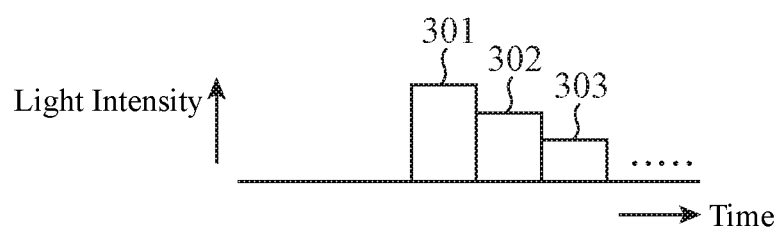

A timing shift between partial reflection light and reception light in the time direction is illustrated in FIG. 3. FIG. 3A is a graph illustrating transmission light, and FIG. 3B is a graph illustrating reception light. A pulse High component 201 illustrated in FIG. 3A has an optical frequency of f0 and does not contribute to reception detection. On the other hand, the pulse Low component 202 has an optical frequency of f0 and is used for reception detection. Reception light 301 from the distance 101 illustrated in FIG. 3B has an optical frequency of f0+fd1, reception light 302 from the distance 102 has an optical frequency of f0+fd2, and reception light 303 from the distance 103 has an optical frequency of f0+fd3. Symbols fd1, fd2, and fd3 denote Doppler frequency shifts, and the reception light is subjected to a Doppler frequency shift by an amount corresponding to the wind speed of the aerosols travelling by the wind. The reception light is multiplexed with the component of the time period of pulse modulation Low out of the partial reflection light.

The reception light and the partial reflection light are sent to the light receiving element 8 via the circulator 5 in a multiplexed state. In the light receiving element 8, the reception light and the partial reflection light are coherently detected and converted into a current signal. At this point, it is possible to maintain a high coherent detection efficiency since polarizations of the reception light and the partial reflection light match.

The current signal from the light receiving element 8 has a Doppler frequency corresponding to a difference in the optical frequency depending on the wind speed. This current signal is converted into a voltage signal by the current-voltage converter 9 and sent to the signal processor 10. By receiving a trigger signal from the light source driver 2, the signal processor 10 can know the optical round-trip time, that is, the origin of the measured distance. Therefore, the distance to the atmospheric range where the reception light has been scattered can be grasped on the time axis of the voltage signal. In the signal processor 10, the voltage signal is converted into a digital signal, and is applied with a time gate at a time period corresponding to each distance like in the process described in Non-Patent Literature 1, and each result is subjected to frequency analysis to obtain a Doppler frequency shift, thereby further obtaining the wind speed. This makes it possible to obtain the distribution of wind speed in a distance direction by one time of pulse transmission. As for a means of frequency analysis, it suffices to use fast Fourier transform or the like. In a case where reception cannot be performed with a sufficient signal-to-noise ratio in one time of pulse transmission, it is only required to perform the above-mentioned pulse transmission and reception operation for multiple times so that a sufficient signal-to-noise ratio can be obtained by signal processing such as incoherent integration.

As described above, in the laser radar device of the first embodiment, it is possible to maintain a high coherent detection efficiency in optical reception without making an optical transmission path a polarization-maintaining system. Moreover, a pulse modulation function is further included, and it is possible to simultaneously obtain the distribution of wind in the distance direction.

Furthermore, since it is not necessary to use a polarization-maintaining system in the optical transmission paths, it is possible to use optical components that does not maintain the polarization. Examples of such optical components include a single mode optical fiber that does not maintain the polarization, an optical fiber amplifier using the optical fiber, an optical circulator using the optical fiber, and a semiconductor laser diode including a pigtail of the optical fiber. In the related art, as for these optical components, costly polarization-maintaining components are required, in order to maintain a high coherent detection efficiency. These costly optical components are unnecessary, and thus both lower costs and a high coherent detection efficiency can be achieved.

Furthermore, an optical splitter which is necessary for separating transmission light and local light, and an optical multiplexer which is necessary for multiplexing the local light and scattered light in the related art are unnecessary, which also exerts the effect of reducing the costs.

Note that although the optical partial reflector 6 is disposed subsequent to the transmission output end of the circulator 5 in the above example; however, in a case where the circulator 5 is a component including an optical fiber pigtail, the optical partial reflector 6 can also be implemented by applying partial reflection coating to the transmission output end. Moreover, a certain amount of partial reflection always occurs at the transmission output end of the circulator 5 due to the difference in the refractive index between the optical fiber and the air, and thus this can be used as a partial reflection function. Therefore, although the function of optical partial reflection itself is necessary in the laser radar device of the present invention, a configuration other than the optical partial reflector 6 may be used as a means for implementing the function.

Furthermore, if the partial reflection function of the optical partial reflector 6 is disposed on the output side of the transmission and reception optical system 7, that is, on the atmosphere side, it is unnecessary for the space between the circulator 5 and the transmission and reception optical system 7 as well as the transmission and reception optical system 7 to maintain the polarization. In other words, the partial reflection function needs to be on the output side of the circulator 5, but as long as a change in polarization is small in the process in which transmission light is transmitted therefrom to the atmosphere, the function works effectively regardless of its location.

Figure 4:
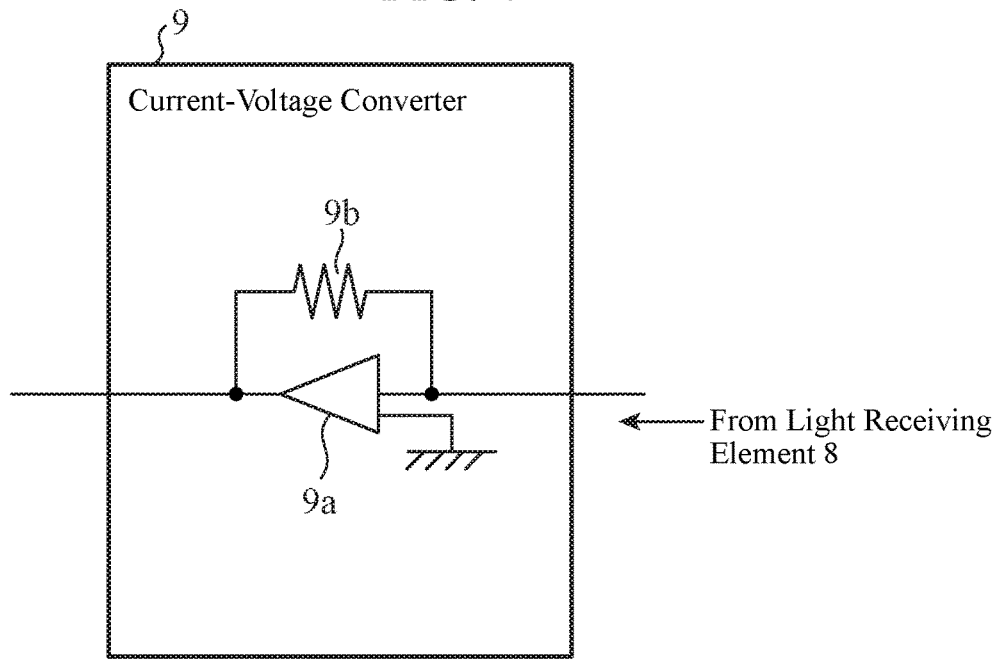
FIG. 4 is a configuration diagram illustrating an example of a current-voltage converter of the laser radar device according to the first embodiment of the present invention.

In the first embodiment of the present invention, setting a high reflectance in the optical partial reflector 6 corresponds to setting a high level of local light in the coherent detection, and thus this makes it easier to bring the reception state closer to the shot noise limit which is the ideal detection state in coherent detection. However, pulse light having a high peak is also reflected at a high reflectance in this case, and thus the light receiving element 8 may be damaged when the reflected pulse light is input to the light receiving element 8. Therefore, there is a case where it is necessary to set a low reflectance in the optical partial reflector 6. In such a case, the level of partial reflection light also decreases, and it is difficult to approach the shot noise limit. In this case, a transimpedance amplifier of a negative feedback type illustrated in FIG. 4 is used as the current-voltage converter 9. This example illustrates a configuration in which a negative feedback resistor 9b is connected to an operational amplifier 9a. With this configuration, it is possible to implement a state close to the shot noise limit even in a case where the level of partial reflection light decreases.

Note that coherent detection is homodyne in the first embodiment if there is no frequency change in the High and Low time periods in the pulse modulation, and thus the positive and negative of the Doppler frequency, that is, the positive and negative of the wind speed cannot be distinguished. However, for example, this laser radar device is mounted on a wind turbine or disposed in the vicinity thereof, and is used for the purpose of measuring the wind in front of the wind turbine. More specifically, in an application case such as wind turbine control by front wind measurement or evaluation of the wind turbine power generation, operation is made with the wind turbine facing in a head wind direction, and thus the positive and negative of the wind speed are known and not required to be distinguished. In other words, there is no problem since the positive and negative of the wind speed are known in advance in a case where the laser radar device is installed in a wind turbine. Note that "in a case where the laser radar device is installed in a wind turbine" includes installment in the vicinity of a wind turbine.

Figure 5A:
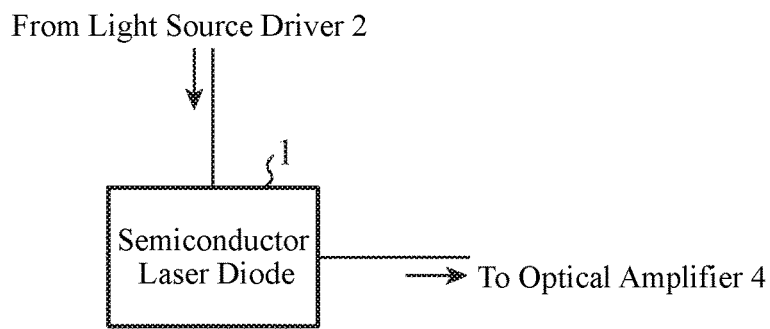
FIGS. 5A and 5B are configuration diagrams each illustrating an example of a light source of the laser radar device according to the first embodiment of the present invention.
Figure 5B:
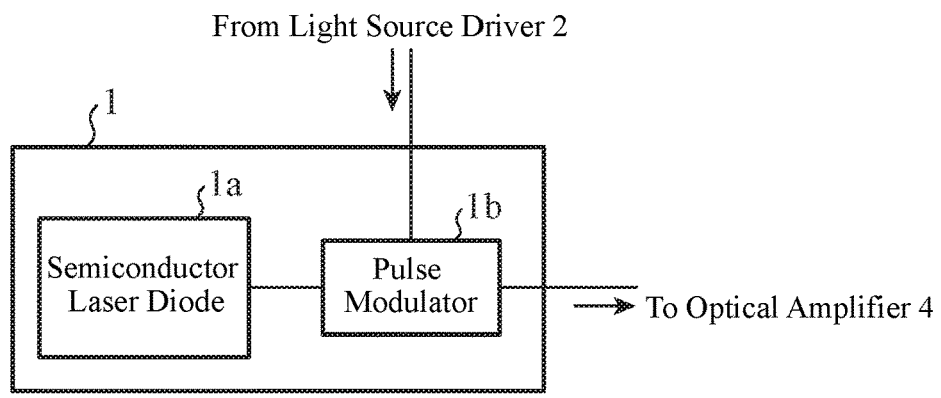

In the first embodiment, the light source 1 is applied with pulse modulation. A specific example of this method is illustrated in FIG. 5. The configuration illustrated in FIG. 5A is an example of direct modulation on a driving current for the light source 1 which is a semiconductor laser diode. In the configuration illustrated in FIG. 5B, output from a CW light source such as a semiconductor laser diode 1a is modulated by a pulse modulator 1b. As for the pulse modulator 1b, for example, an optical semiconductor amplifier, a Mach-Zehnder type optical modulator, or an acousto-optic (AO) modulator are conceivable. Of these, in particular, in direct modulation to the semiconductor laser diode 1a and in modulation using an optical semiconductor amplifier and an acousto-optic modulator, pulse modulation involves a frequency shift. Therefore, if this frequency shift amount is appropriately adjusted, this is the intermediate frequency in the coherent detection, thereby allowing the positive and negative of the Doppler frequency shift, that is, the positive and negative of the wind speed, to be distinguished, and enabling further enhancement in the functionality.

Furthermore, in the first embodiment, the laser radar device has been described as a coherent laser radar that measures the wind; however, the measurement target is not limited to the wind, and the laser radar device is applicable to all laser radars that adopt coherent detection by a pulse method, such as a laser range finder that measures, for example, round-trip time of pulse light to a hard target.

Figure 6:
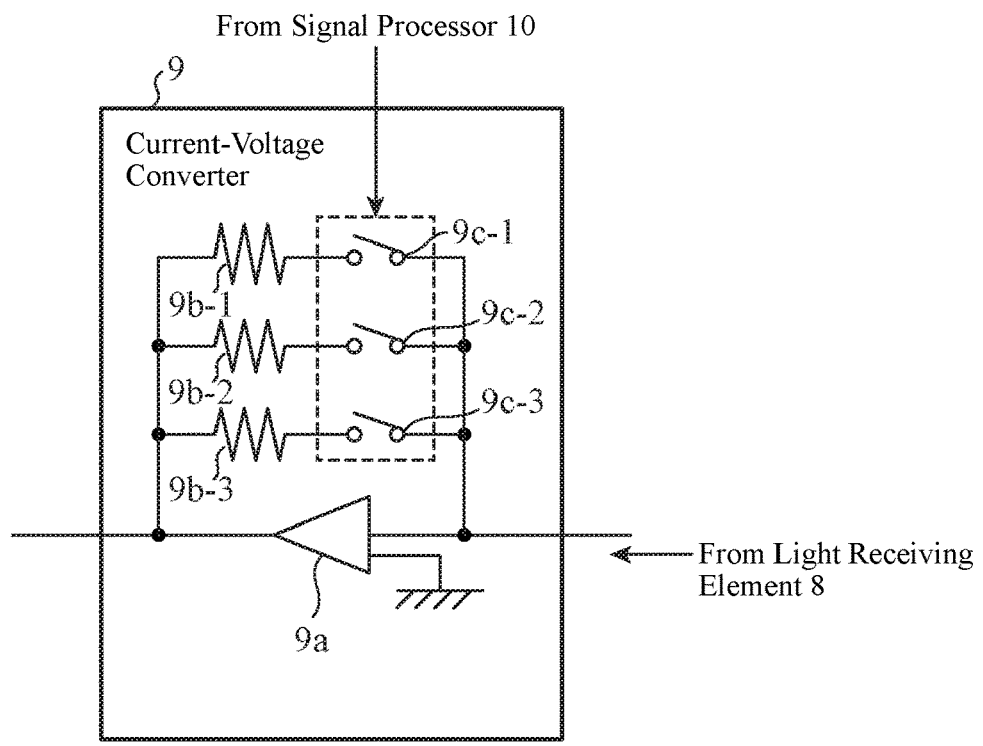
FIG. 6 is a configuration diagram illustrating another example of the current-voltage converter of the laser radar device according to the first embodiment of the present invention.

In the first embodiment, there may be a case where the level of partial reflection light is not stable, so that fluctuation in the noise level or the like in the signal processing interferes with the Doppler frequency shift and the wind speed detection processing. However, in this case, the noise level can be stabilized by making the conversion gain in the current-voltage converter 9 variable and controlling this gain depending on the reception state. Specifically, as illustrated in FIG. 6, a conceivable approach is to prepare multiple feedback resistors of a negative feedback transimpedance gain and to switch among the feedback resistors. The configuration illustrated in the figure is an example in which three negative feedback resistors 9b-1, 9b-2, and 9b-3 are switched using switches 9c-1, 9c-2, and 9c-3 provided corresponding to the negative feedback resistors 9b-1, 9b-2, and 9b-3, respectively. Note that, although not illustrated, this configuration includes the function of transmitting a control signal to the switches 9c-1, 9c-2, and 9c-3 from the signal processor 10 to the current-voltage converter 9.

Furthermore, in a case where the partial reflection light is unstable as mentioned above, the partial reflection light can be made constant by newly providing the function of adjusting a modulation signal from the light source driver 2. In this case, although not illustrated, the function of transmitting a control signal from the signal processor 10 to the light source driver 2 is provided.

In addition, in a case where the partial reflection light is unstable as mentioned above, the partial reflection light can be made constant by newly providing the function of adjusting the reflectance of the optical partial reflector 6. In this case, although not illustrated, the function of transmitting a control signal from the signal processor 10 to the optical partial reflector 6 is provided. As for a means for adjusting the reflectance, a means such as changing the inclination of the optical partial reflector is conceivable.

The first embodiment has been described on the assumption that all optical components are non-polarization-maintaining components; however, even when some or all of the components are polarization-maintaining components, it is goes without saying that this poses no problem to the functionality. If non-polarization-maintaining components can be used in some components, this alone can reduce costs. Moreover, even when polarization-maintaining components are used for all the components, there is an effect of reducing costs since an optical splitter and a multiplexer are unnecessary which used to be necessary in a conventional laser radar using a pulse method and coherent detection.

Figure 7:
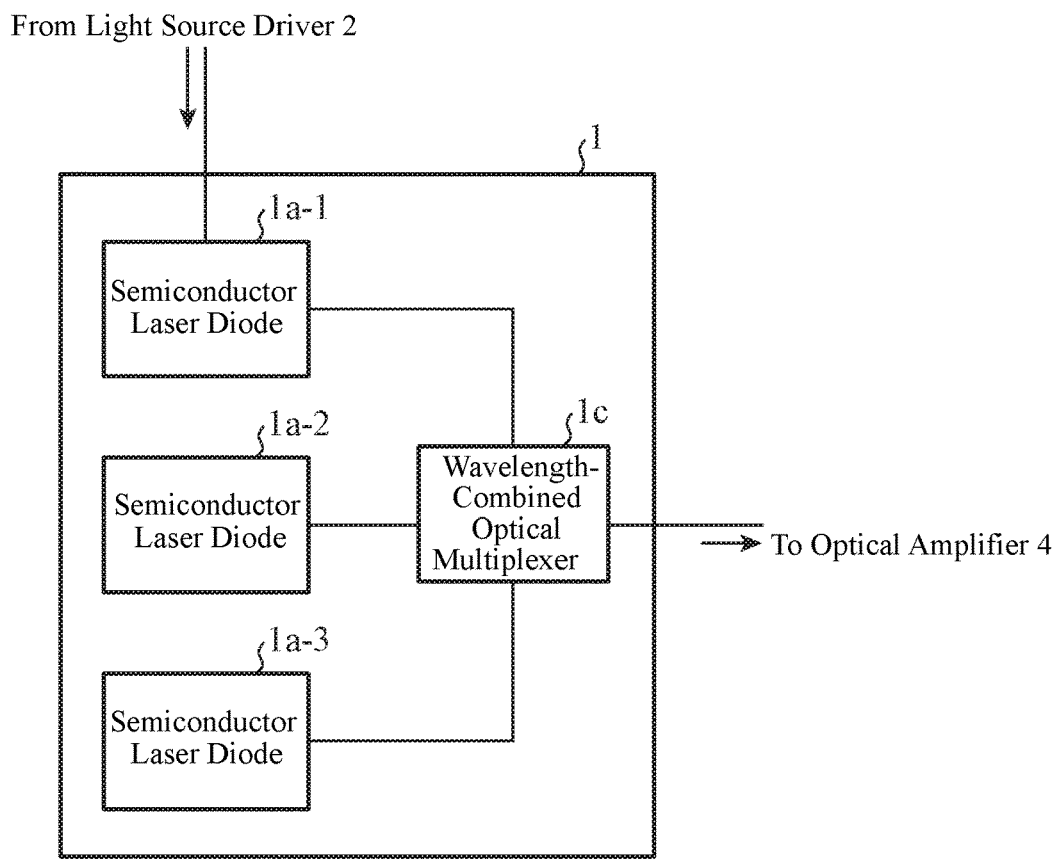
FIG. 7 is a configuration diagram illustrating another example of the light source of the laser radar device according to the first embodiment of the present invention.

In the first embodiment, the case of a single light source 1 has been described; however, if multiple light sources that output different wavelengths are provided as illustrated in FIG. 7 and these pieces of output are multiplexed, another effect is newly obtained. In FIG. 7, an example in which semiconductor laser diodes 1a-1, 1a-2, and 1a-3 each of which outputs a different wavelength, and a wavelength-combined optical multiplexer 1c are included, is illustrated. With such a configuration, especially, for example, in a case where the optical amplifier 4 is an optical fiber amplifier and the pulse peak in optical output is limited due to a nonlinear phenomenon in the optical fiber, it is possible to differentiate the multiple wavelengths so that the nonlinear phenomenon can be avoided, and to avoid the pulse peak from being limited.

As described above, the laser radar device of the first embodiment includes: the optical transmission unit for transmitting a pulse-modulated optical signal having a light intensity set as a low-level component of a pulse; the circulator for transmitting the optical signal as transmission light and acquiring reflection light from a target in the atmosphere as reception light; the optical partial reflecting unit for reflecting the optical signal, the optical partial reflecting unit being provided on a path through which the transmission light is transmitted from the circulator to the atmosphere; and the detection unit for performing coherent detection on the reception light using, as local light, a signal in a Low level section of the optical signal reflected by the optical partial reflecting unit. Therefore, the configuration is simplified, thereby reducing costs.

Further according to the laser radar device of the first embodiment, the detection unit includes: the light receiving element for performing coherent detection on the local light and the reception light and converting a result of the coherent detection to a current signal; the current-voltage converter for converting the current signal from the light receiving element into a voltage signal; and the signal processor for performing frequency analysis on the voltage signal from the current-voltage converter. Therefore, a configuration as a coherent detection unit can be easily implemented.

Moreover, according to the laser radar device of the first embodiment, the current-voltage converter is a negative feedback transimpedance amplifier, and thus a state close to the shot noise limit can be implemented even in a case where when the level of partial reflection light decreases.

Furthermore, since the laser radar device of the first embodiment is installed at a position where the wind direction is a head wind direction, the wind speed can be measured even in a case where there is no frequency change in the High and Low time periods in pulse modulation.

Furthermore, according to the laser radar device of the first embodiment, since a position where the wind direction is a head wind direction is a position of a wind turbine, the wind speed can be measured even in a case where there is no frequency change in the High and Low time periods in pulse modulation.

Also according to the laser radar device of the first embodiment, the optical transmission unit employs a semiconductor laser diode as the light source for emitting light, and applies pulse modulation on a driving current for the semiconductor laser diode, and thus an optical signal having a light intensity set as the Low level component of the pulse can be easily transmitted.

Further according to the laser radar device of the first embodiment, the optical transmission unit includes the light source for outputting a continuous wave and a pulse modulator, and a single or multiple semiconductor amplifiers or a single or multiple acousto-optic modulators are used as the pulse modulator, and thus it is possible to distinguish between the positive and negative of the wind speed by appropriately adjusting the frequency shift amount, thereby enabling further enhancement in the functionality.

According to the laser radar device of the first embodiment, the conversion gain of the current-voltage converter is variable, and the conversion gain is controlled by the signal processor, and thus the gain can be controlled depending on the reception state of reception light, thereby enabling stabilization of the noise level.

In addition, according to the laser radar device of the first embodiment, the extinction ratio which is a ratio between the High level and the Low level of the pulse of an optical signal output from the optical transmission unit is controlled by the signal processor, and thus partial reflection light can be made constant.

Moreover, according to the laser radar device of the first embodiment, the reflectance in the optical partial reflecting unit is controlled by the signal processor, and thus partial reflection light can be made constant.

Further according to the laser radar device of the first embodiment, the optical transmission unit includes multiple light sources, multiplexes multiple optical signals from these light sources, and outputs the multiplexed optical signals as an optical signal, and thus limitations on the pulse peak can be avoided by differentiating multiple wavelengths.

Note that the present invention may include modifications of any component of the embodiment, or omission of any component of the embodiment within the scope of the present invention.

INDUSTRIAL APPLICABILITY

As described above, a laser radar device according to the present invention relates to a configuration using coherent detection, and is suitable for use in a laser radar device for measuring wind.

REFERENCE SIGNS LIST

1: light source, 1a, 1a-1, 1a-2, 1a-3: semiconductor laser diode, 1b: pulse modulator, 1c: wavelength-combined optical multiplexer, 2: light source driver, 3: optical transmission unit, 4: optical amplifier, 5: circulator, 6: optical partial reflector, 7: transmission and reception optical system, 8: light receiving element, 9: current-voltage converter, 9a: operational amplifier, 9b, 9b-1, 9b-2, 9b-3: negative feedback resistor, 9c-1, 9c-2, 9c-3: switch, 10: signal processor, 11: detection unit

The invention claimed is:

1. A laser radar device comprising:
an optical transmitter to transmit a pulse-modulated optical signal having a light intensity set as a low-level component of a pulse;
a circulator to transmit the optical signal as transmission light and acquire reflection light from a target in an atmosphere as reception light;
an optical partial reflector to reflect the optical signal, the optical partial reflector being provided on a path through which the transmission light is transmitted from the circulator to the atmosphere; and
a detector to perform coherent detection on the reception light using, as local light, a signal in a Low level section of the optical signal reflected by the optical partial reflector.

2. The laser radar device according to claim 1, wherein the detector comprises:
a light receiving element to perform coherent detection on the local light and the reception light and convert a result of the coherent detection to a current signal;
a current-voltage converter to convert the current signal from the light receiving element into a voltage signal; and
a signal processor to perform frequency analysis on the voltage signal from the current-voltage converter.

3. The laser radar device according to claim 2, wherein the current-voltage converter is a transimpedance amplifier of a negative feedback type.

4. The laser radar device according to claim 2, wherein a conversion gain of the current-voltage converter is variable, and the conversion gain is controlled by the signal processor.

5. The laser radar device according to claim 2, wherein an extinction ratio which is a ratio between a high level and a low level of the pulse of the optical signal output from the optical transmitter is controlled by the signal processor.

6. The laser radar device according to claim 2, wherein a reflectance in the optical partial reflector is controlled by the signal processor.

7. The laser radar device according to claim 1, wherein the laser radar device is installed at a position where a wind direction is a head wind direction.

8. The laser radar device according to claim 7, wherein the position where the wind direction is the head wind direction is a position of a wind turbine.

9. The laser radar device according to claim 1, wherein the optical transmitter uses a semiconductor laser diode as a light source to emit light and applies pulse modulation to a driving current for the semiconductor laser diode.

10. The laser radar device according to claim 1, wherein the optical transmitter comprises a light source to output a continuous wave and a pulse modulator, and a single or multiple semiconductor amplifiers or a single or multiple acousto-optic modulators are used as the pulse modulator.

11. The laser radar device according to claim 1, wherein the optical transmitter comprises multiple light sources, multiplexes multiple optical signals from the light sources, and outputs the multiplexed optical signals as the optical signal.

* * * * *